(12) United States Patent
Love et al.

(10) Patent No.: US 10,889,528 B2
(45) Date of Patent: *Jan. 12, 2021

(54) ORGANIC LIQUID FERTILIZER

(71) Applicants: Bill Love, Overland Park, KS (US);
Development & Planning Consultants, L.L.C., Overland Park, KS (US);
Dennis Crabtree, Tarpon Springs, FL (US)

(72) Inventors: Bill Love, Overland Park, KS (US);
Dennis Crabtree, Overland Park, KS (US); John Martin, Overland Park, KS (US)

(73) Assignees: Bill Love, Overland Park, KS (US);
Development & Planning Consultants, L.L.C., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,538

(22) Filed: Dec. 31, 2019

(65) Prior Publication Data

US 2020/0140348 A1 May 7, 2020

Related U.S. Application Data

(63) Continuation of application No. 16/297,334, filed on Mar. 8, 2019, now Pat. No. 10,556,837, which is a
(Continued)

(51) Int. Cl.
*C05F 3/00* (2006.01)
*C05C 11/00* (2006.01)
(Continued)

(52) U.S. Cl.
CPC .................. *C05F 3/00* (2013.01); *C05C 3/00* (2013.01); *C05C 11/00* (2013.01); *C05G 5/23* (2020.02); *Y02A 40/20* (2018.01); *Y02P 20/145* (2015.11)

(58) Field of Classification Search
CPC .................................. C05C 11/00; C05F 3/00
See application file for complete search history.

(56) References Cited

U.S. PATENT DOCUMENTS 3,865,568 A * 2/1975 Kratzer ..................... C05F 3/00
                                                                      71/21
4,093,516 A    6/1978 Lang
(Continued)

FOREIGN PATENT DOCUMENTS

FR          517548       5/1921
JP        2006212606     8/2006
(Continued)

OTHER PUBLICATIONS

International Search Report and Written Opinion in corresponding PCT/US2012/047890, dated Jan. 23, 2013.
(Continued)

*Primary Examiner* — Wayne A Langel
(74) *Attorney, Agent, or Firm* — Hovey Williams LLP

(57) ABSTRACT

A fertilizer derived from an organic source and a method of making are provided. The fertilizer of the present invention advantageously has a nitrogen content greater than 4%. The method of making the fertilizer also produces potable water.

20 Claims, 4 Drawing Sheets

Related U.S. Application Data continuation of application No. 16/020,588, filed on Jun. 27, 2018, now abandoned, which is a continuation of application No. 13/791,442, filed on Mar. 8, 2013, now Pat. No. 10,023,501, which is a continuation of application No. 13/556,102, filed on Jul. 23, 2012, now abandoned, said application No. 13/791,442 is a continuation of application No. PCT/US2012/047890, filed on Jul. 23, 2012.

(60) Provisional application No. 61/572,751, filed on Jul. 21, 2011, provisional application No. 61/572,749, filed on Jul. 21, 2011.

(51) Int. Cl.
*C05C 3/00* (2006.01)
*C05G 5/23* (2020.01)

(56) References Cited

U.S. PATENT DOCUMENTS

| | | | | |
|---|---|---|---|---|
| 5,019,149 A | * | 5/1991 | Hawkins | C05D 9/02 71/29 |
| 5,082,487 A | * | 1/1992 | Mayer | C05G 5/23 71/30 |
| 5,114,459 A | * | 5/1992 | Peters | C05G 5/23 71/32 |
| 6,364,926 B1 | | 4/2002 | Gryzik et al. | |
| 6,386,126 B1 | * | 5/2002 | Chamberlain | C05G 5/23 111/120 |
| 10,023,501 B2 | * | 7/2018 | Bisson | C05C 11/00 |
| 2002/0124613 A1 | | 9/2002 | Sower | |
| 2004/0065127 A1 | | 4/2004 | Connell | |
| 2007/0039363 A1 | | 2/2007 | Macura | |
| 2008/0302151 A1 | | 12/2008 | Stemwedel | |
| 2009/0173122 A1 | | 7/2009 | Stemwedel | |
| 2009/0282882 A1 | * | 11/2009 | Verhave | C05F 17/40 71/7 |

FOREIGN PATENT DOCUMENTS

| | | |
|---|---|---|
| WO | 2004089833 | 10/2004 |
| WO | 2011151511 | 12/2011 |

OTHER PUBLICATIONS

Supplementary European Search Report in corresponding EP Application Serial No. 12814285, dated Jan. 27, 2015.
Office Action in corresponding U.S. Appl. No. 16/297,334, dated Apr. 2, 2019.
Office Action in corresponding U.S. Appl. No. 16/297,334, dated Aug. 1, 2019.
Willers, et al., "Concentration of urine from fatteners combined with ammonia removal by scrubbing exhaust air of a pig house", International Symposium on Animal, Agricultural and Food Processing Wastes, 2003.

\* cited by examiner

ORGANIC LIQUID FERTILIZER

RELATED APPLICATIONS

This application is a continuation of U.S. patent application Ser. No. 16/297,334, filed Mar. 8, 2019, which is a continuation of U.S. patent application Ser. No. 16/020,588, filed Jun. 27, 2018, now abandoned, which is a continuation of U.S. patent application Ser. No. 13/791,442, filed Mar. 8, 2013, now U.S. Pat. No. 10,023,501, which is a continuation of U.S. patent application Ser. No. 13/556,102, filed on Jul. 23, 2012 and relates to and claims priority to U.S. Provisional Patent Application No. 61/572,751, filed on Jul. 21, 2011, and U.S. Provisional Patent Application No. 61/572,749, filed on Jul. 21, 2011, the contents and teachings of which are incorporated herein by reference. U.S. patent application Ser. No. 13/791,442, filed Mar. 8, 2013, now U.S. Pat. No. 10,023,501, is also a continuation of International Patent Application No. PCT/US2012/047890, filed on Jul. 23, 2012, and relates to and claims priority to U.S. Provisional Patent Application No. 61/572,751, filed on Jul. 21, 2011, and U.S. Provisional Patent Application No. 61/572,749, filed on Jul. 21, 2011, the contents and teachings of which are incorporated herein by reference. The content and teachings of U.S. patent application Ser. No. 13/556,102 are also incorporated herein by reference.

BACKGROUND

Adequate nitrogen in the contents of soil is necessary for a healthy lawn, plants, and crops. Fertilizers containing nitrogen are used to enhance the nitrogen levels in the soil to produce greener, lusher, faster-growing plants, lawns, and crops. Nitrogen must be available for the plant to use it, meaning that the nitrogen must be converted to $NH_4^+$ or $NH_3$. The Nitrogen may be readily available or organisms in the soil must covert the Nitrogen into a usable form.

Inorganic fertilizers, while inexpensive and easy to apply, tend to wash the nutrients out of the soil, requiring reapplication on a regular basis. Additionally, since inorganic fertilizers are concentrated, they tend to burn plant roots more than organic materials.

Fertilizers that are derived from an organic source are preferable for a variety of reasons. They have a lower burning potential and a lower leach potential; and they replenish the soil with micro-nutrients, essential amino acids, and organic matter that were consumed by previous agricultural and horticultural activity. However, most fertilizers derived from an organic source have a nitrogen content that is less than 3% and the Nitrogen is usually in a slow release form. The slow release nitrogen in most fertilizer derived from an organic source must be broken down over time by microorganisms in the soil in order for that nitrogen to be converted to a form that is usable by plants and crops. This element of organic-derived fertilizer pushes many to purchase synthetic fertilizers that provide a higher level of nitrogen and a quicker release into the soil and uptake by the plant.

SUMMARY OF THE INVENTION

The present invention provides for a method of making a liquid fertilizer. The method for making fertilizer of the present invention generally includes a) obtaining a liquid organic waste filtrate; b) adding an acid and c) performing an evaporation process on the liquid organic waste filtrate. The liquid organic waste filtrate originates from a liquid organic waste material wherein the suspended solids have been removed. The method of making the liquid fertilizer where the method starts from liquid organic waste would generally include: a) obtaining liquid organic waste; b) removing the suspended solids from the liquid organic waste; c) adding an acid; and d) performing an evaporation process on the liquid organic waste. The liquid organic waste filtrate is created by obtaining liquid organic waste and removing the suspended solids. Optionally the method includes a second addition of an acid to adjust the final pH of the liquid fertilizer. The liquid organic waste is preferably derived from an organic source. This liquid organic waste is preferably derived from animal manure, specifically, poultry manure.

The present invention also provides for a fertilizer derived from an organic source with a higher level of nitrogen than other fertilizers derived from an organic source. The fertilizer of the present invention advantageously contains at least 4% Nitrogen, which is greater than previous organic fertilizer compositions. The Nitrogen in the fertilizer of the present invention is preferably Ammoniacal Nitrogen. This Ammoniacal Nitrogen is 100% water soluble and is therefore quickly released into the soil and readily available for plants. Further, the fertilizer of the present invention is derived from an organic source. The fertilizer of the present invention preferably comprises a fertilizer that contains from about 4% to 10% nitrogen, more preferably from about 4% to 6% nitrogen. This is a higher nitrogen content than what is presently available in fertilizers that are derived from organic materials.

DETAILED DESCRIPTION OF THE PREFERRED EMBODIMENT

Figure 1:
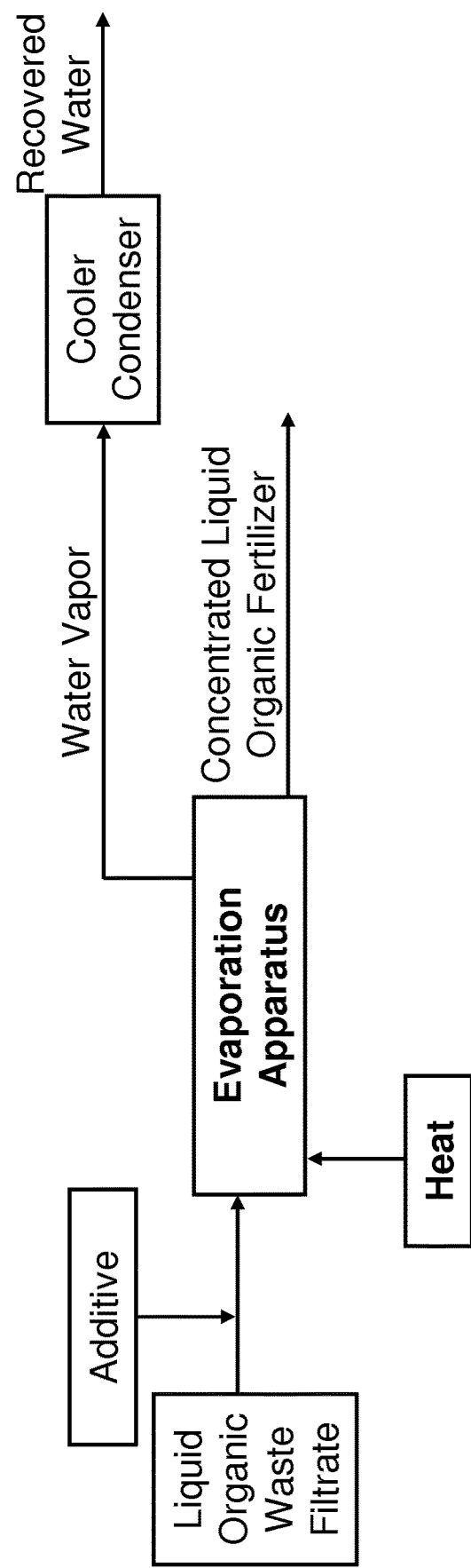
FIG. 1 is a schematic drawing of one embodiment of the method of the present invention.
Figure 2:
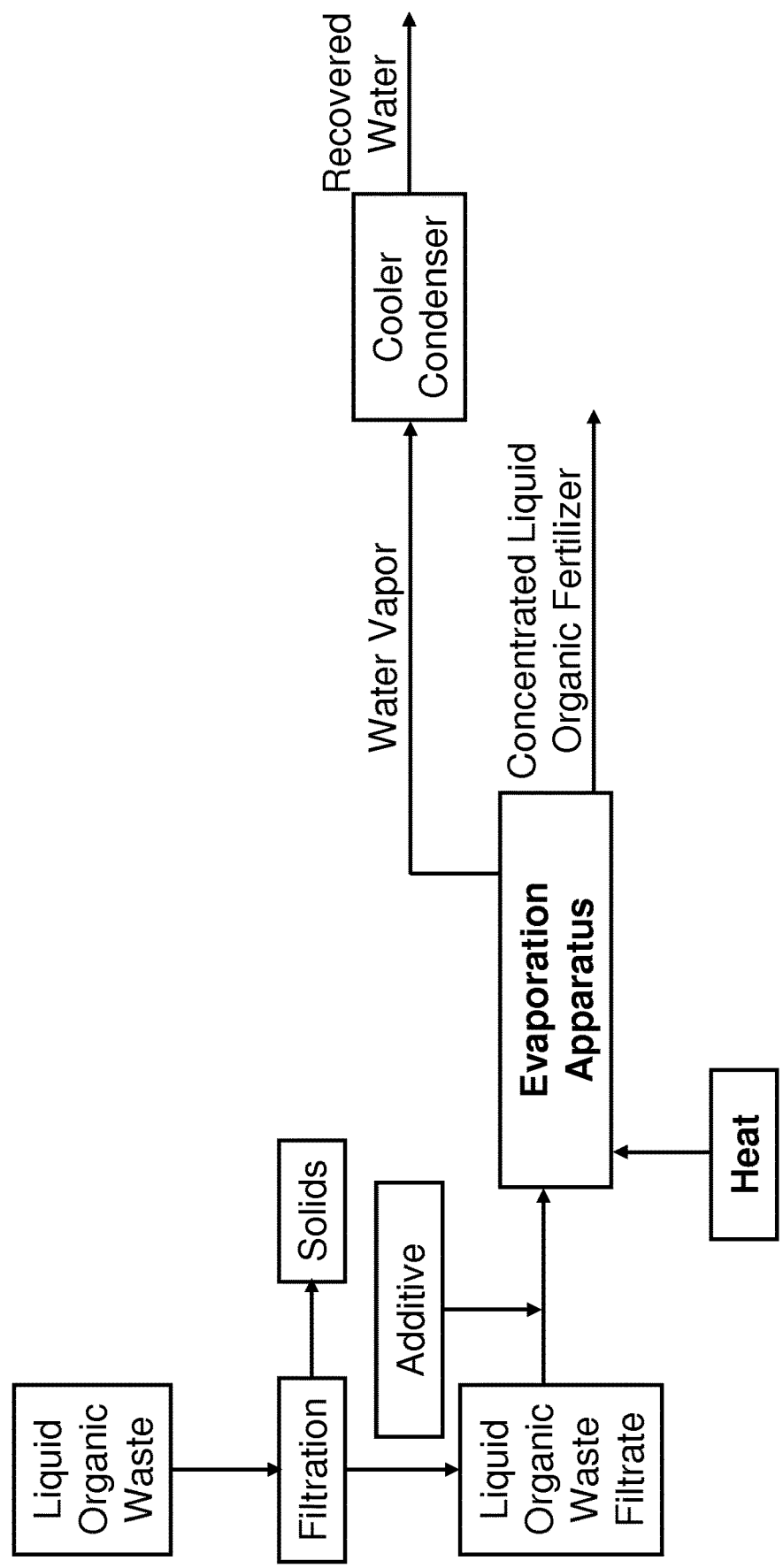
FIG. 2 is a schematic drawing of an additional embodiment of the method of the present invention.
Figure 3:
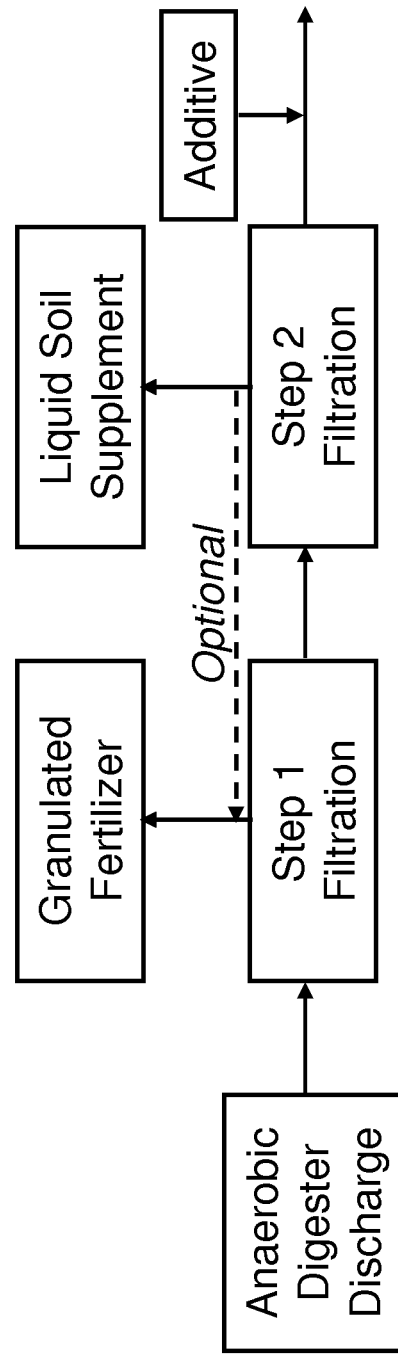
FIG. 3 is a schematic drawing of an embodiment that demonstrates the method of obtaining the liquid organic waste filtrate and the further processing to the ultimate end product.
Figure 3:
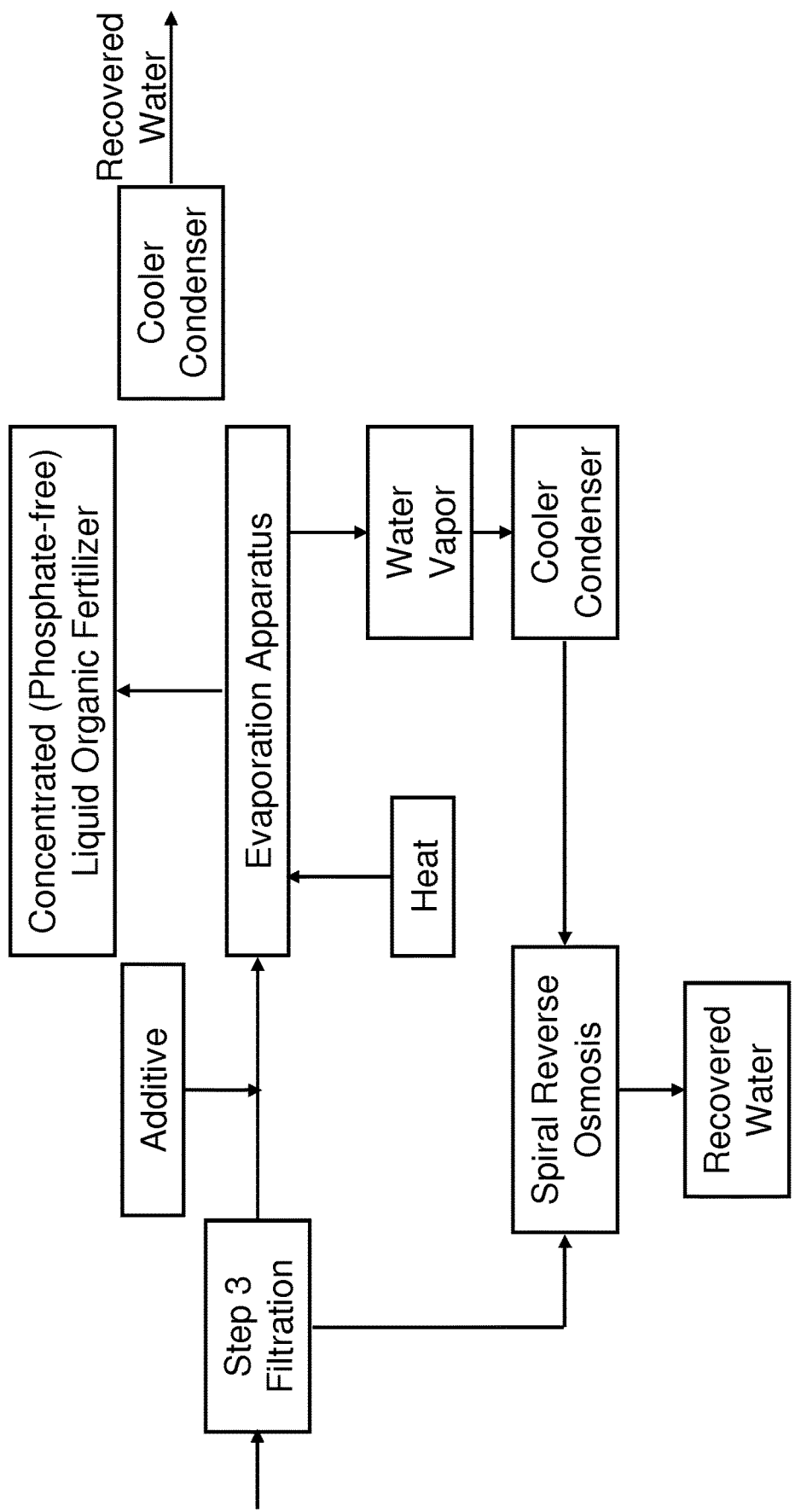

A method of making a liquid organic fertilizer is provided. The method generally comprises the following steps: a) obtaining a liquid organic waste filtrate; b) adding an acid to the liquid organic waste filtrate; and c) performing an evaporation process on the liquid organic waste filtrate.

A further embodiment provides a method for making fertilizer that includes the steps of: a) obtaining liquid organic waste; b) removing suspended solids from the liquid organic waste, forming a liquid organic waste filtrate; c) adding an acid; and d) performing an evaporation process on the liquid organic waste filtrate. In an alternate embodiment, the method further comprises the step of adding a second acid. Preferably, this second acid is added after the evaporation process is performed on the liquid organic waste filtrate.

The liquid organic waste can be any aqueous solution that contains a dissolved protein, Ammoniacal Nitrogen, and other soluble nutrients. If the organic waste is in a solid or semi-solid form, water is preferably added to the solid or semi-solid material to form a fluid mixture. For example, in an embodiment where animal manure is utilized, water is added to form a fluid mixture creating liquid organic waste.

The water preferably creates a fluid mixture of water and suspended and dissolved solids making up the liquid organic waste. An effluent discharge from an anaerobic digester is a preferred liquid organic waste. The suspended and dissolved solids in the liquid organic waste preferably include, but are not limited to: nitrogen, phosphate, potash, secondary nutrients, micro-nutrients and organic matter found in anaerobically digested manure or other agriculturally related organic waste. The temperature of starting material is preferably between 90° F. and 140° F., more preferably from about 132° F. to 136° F. This temperature is preferably achieved using a heat exchanger. The liquid organic waste for the method of the present invention is preferably derived from an organic source. The liquid organic waste is preferably derived from natural sources that include, but are not limited to, plant and animal-biproducts, rock powders, seaweed, inoculants, conditioners, dairy product waste, livestock manure, liquid manure, worm castings, peat, guano, compost, blood meal, bone meal, fish meal, decomposing crop residue, cheese whey, dairy product waste, livestock manure, mixed liquor from food and livestock processing facilities, wastewaters from a variety of food processing operations, and combinations thereof. However, the list provided herein is not meant to be limiting, as any natural source that provides nitrogen, phosphate, and potash will work for purposes of the present invention.

The liquid organic waste is preferably filtered to remove suspended solids. The removal of suspended solids from the liquid organic waste creates the liquid organic waste filtrate. This liquid organic waste filtrate preferably contains less than 2,000 parts per million (hereinafter "ppm") suspended solids, more preferably, less than 1,500 ppm suspended solids, and most preferably 1,200 ppm suspended solids or less. The liquid organic waste filtrate preferably contains nitrogen, phosphate, potash, secondary nutrients, micro-nutrients and organic matter. The nitrogen is preferably Ammoniacal Nitrogen.

The step of removing suspended solids can be performed by any mechanism capable of filtering particles. The suspended solids are preferably those particles that won't pass through a 270 Dalton membrane under 500 psi of pressure. The removal of suspended solids can preferably be completed using at least one, at least two, or at least three or more filtration steps. The removed suspended solids can be further processed to produce granular fertilizers. These filtration steps may utilize the same method of filtration or different methods of filtration. Preferably, in an embodiment where three filtration steps are performed, the first step removes large suspended solids (greater than 24 microns), the second step removes small suspended solids (less than 24 microns), and the third step removes any residual solids. Preferably, the suspended solids are removed using one or more filtration mechanisms including, but not limited to, mechanical screening, microfiltration, ultrafiltration, nanofiltration, reverse osmosis, membrane separation, and electro-coagulation. Preferred machinery for removing suspended solids include, but are not limited to, BioPulse system provided by bioprocess H2O (Portsmith, R.I.); Petro Membrane Bioreactor ("MBR") (Siemens Industry, Inc. USA); PURON MBR (Koch Membrane Systems, Inc., Wilmington, Mass.); Pall Aria Integrated MF/NF (microfiltration/nanofiltration) and MF/RO (microfiltration/reverse osmosis) systems (Pall Corporation, Port Washington, N.Y.); Alfa Laval Filtration (Alfa Laval, Sweden); and NF (nanofiltration) and RO (reverse osmosis) Membrane Separation (BKT Co Ltd, Korea). The filtration step(s) result in the liquid organic waste filtrate.

In a further embodiment, the step of removing suspended solids further includes a second filtration step. This second filtration step preferably removes any material of a size that may disrupt, impeded, or block an irrigation system. Any filtering process that removes the material of a size that might disrupt an irrigation system would work for purposes of the present invention. Preferred filtering processes include, but are not limited to, the use of a 500-mesh screen, membrane filters, continuous agitation through turbulent flow, or reverse osmosis, with or without a self-cleaning method of filtration.

In yet a further embodiment, the step of removing suspended solids includes a third filtration step. The third filtration step can be any filtration method referenced herein, however, it is preferred that it is reverse osmosis.

An acid is preferably added to the liquid organic waste filtrate. Preferably, the acid is utilized to adjust the pH of the liquid organic waste filtrate to a pH of 7 or lower. Preferably, the pH is adjusted to a pH of between pH 3 to pH 7, more preferably from about pH 5 to pH 7, and most preferably about pH 6.5. Additionally, the acid preferably acts to bind the ammonium molecules so that they are able to release free ammonia, preferably without producing suspended solids. In an embodiment where an acid is utilized, the acid can be any organic or inorganic acid that will adjust the pH of the liquid organic waste filtrate to a pH 7 or less, more preferably a pH of 6.5. The type and amount of acid will vary depending on the given situation, but the amount and type of acid is enough to lower the pH of the liquid organic waste filtrate to a pH of 7 or less. The acid is preferably selected from, but is not limited to, citric acid, lactic acid, L-malic acid, vinegar (acetic acid), phosphoric acid, sulfuric acid, hydrochloric acid, nitric acid, and combinations thereof. Most preferably, the acid is citric acid. In a most preferred embodiment, the acid utilized is an organic acid. Any organic acid will work for purposes of the present invention. Preferred organic acids include, but are not limited to, lactic acid, acetic acid, formic acid, citric acid, oxalic acid, and uric acid. Inorganic acids may also be utilized for purposes of the present invention. Inorganic acids include, but are not limited to, hydrochloric acid, nitric acid, phosphoric acid, sulfuric acid, hydrofluoric acid, hydrobromic acid, perchloric acid, and combinations thereof. The acid is preferably added in an amount that is sufficient to change the pH of the liquid organic waste filtrate to a pH 7 or lower. The amount of acid added depends on the type of acid used, starting pH of the liquid organic waste filtrate, the buffering capacity of the liquid organic waste filtrate, and the Nitrogen content of the liquid organic waste filtrate. In a preferred embodiment the acid is added in an amount of from about 0.1 lb/gallon to 2.0 lb/gallon, more preferably from about 0.2 lb/gallon to 1.5 lb/gallon, still more preferably from about 0.4 lb/gallon to 1.0 lb/gallon, and most preferably, the acid is added in an amount of about 0.6 lb/gallon.

The liquid organic waste filtrate and acid are preferably exposed to an evaporation process. The evaporation process may be any process suitable for removing water from the composition. In a preferred embodiment, the composition is in a liquid form following the evaporation step. Preferably, a vacuum evaporation is utilized. Other possible vacuum evaporators include, but are not limited to, the vacuum evaporators made by Veolia Water Solutions and Technologies (Cary, N.C.), HF Pure Water (Compton, Calif.), Mech-Chem Associates (Norfolk, Mass.), and Econ Industries (Starnberg, Germany). The evaporation process requires heat to remove water from the composition. The temperature range of the evaporation process is preferably from about 90-110° F., more preferably from about 100-105° F. In an embodiment that includes a vacuum evaporation process, the vacuum range is preferably from about 26-28 inches of mercury, with the preferred range being from about 27-28 inches of mercury. The time the evaporator is used depends on the temperature and pressure utilized and can be determined in line with industry standards.

Preferably, the evaporation process creates water vapor that can be captured and transformed into potable water. Advantageously, during the evaporation step, water vapor is created. This water vapor is then cooler condensed into liquid water. The water that results from the method of the present invention is clean and suitable for drinking.

An alternate embodiment of the present invention is described in the next several paragraphs. The alternate embodiment starts with an anerobic digester discharge (hereinafter "digestate"). This digestate can be any fluid mixture of water and suspended and/or dissolved solids. The suspended and dissolved solids in the digestate preferably include, but are not limited to nitrogen, phosphate, potash, secondary nutrients, micro-nutrients and organic matter found in anaerobically digested manure or other agriculturally related organic waste. Preferably, the digestate is at a temperature of between 80° F. and 132° Fahrenheit.

The digestate is preferably then processed by a filtering mechanism to remove and capture the large suspended solids, hereinafter called "recovered solids". These large suspended solids are preferably greater than 24 microns in size. The recovered solids preferably have a moisture content of from about 70% to 90% moisture, more preferably about 80% moisture. The recovered solids are then preferably processed in a twin-screw helical heat exchanger to produce granular fertilizer with a moisture content of 10% or less, more preferably 5% or less. The heat utilized to process the recovered solids is preferably from an indirect source, such as, but not limited to hot oil flowing around the ducts. Preferably, the rotation of helical ducts severs to cause the solids to bind together to form fertilizer granules. Ammonia-rich exhaust gas is preferably created by this process that can be cooled and added to the liquid filtrate and further processed. The formation of granular fertilizer is an optional part of the method of the present invention and is not a required element. In an alternate embodiment, the recovered solids are discarded.

In one embodiment, the liquid filtrate remaining after the suspended solids are removed is pH adjusted with an acid to produce a pH of approximately 7.0. The acid added can be any acid capable of adjusting the pH of the liquid filtrate. Preferably an organic acid is used, more preferably citric acid is utilized. The liquid filtrate is preferably then filtered at least one additional time, more preferably at least two additional times. The first additional filtration step preferably removes the remaining small suspended solids. The small suspended solids are preferably less than or equal to 24 microns. This first additional filtration step is preferably completed using membrane filters, however, any filtration system capable of removing small suspended solids will work. Other filtration methods contemplated by the present invention are discussed herein. The second additional filtration step preferably removes molecular dissolved solids. This second additional filtration step is preferably completed using a nano-filter, however, any filtration system capable of removing molecular dissolved solids, such as those filtration methods discussed herein.

The liquid organic waste filtrate resulting from the above process is a liquid fertilizer product with unique solids and nutrient content of exceptional value for soil conditioning, replacement of exhausted nutrients, and restoration of soil health. The second filtration step is a semi-continuous process that produces reject in quantifiable batch volumes. After a programmed interval, the valve of the extruder is opened to release the accumulated reject. This accumulated reject is isolated and removed to storage. At this point, the next batch of liquid organic waste is filtered. This cycle repeats indefinitely. Citric acid is preferably added to the resulting liquid filtrate from the second filtration step to adjust the pH. This pH adjustment preferably stabilizes the ammonium nitrogen contained in the permeate and produces entrained carbon dioxide. The carbon dioxide gas is liberated from the liquid filtrate and then the acidified liquid filtrate is filtered again in the third additional filtration step. The concentrated stream produced by the third filtration step is then concentrated by vacuum evaporation. This vacuum evaporation further concentrates the liquid organic waste filtrate from the second filtration step and produces the phosphate-free liquid organic fertilizer of the present invention. The water vapor produced during this process is preferably condensed and combined with permeate obtained from the final filtration step. The resultant solution is clean water of such quality required to meet the NPDES discharge permit requirements established by the USEPA Clean Water Act of 1972.

The final products of this alternate embodiment of the method of the present invention are preferably a liquid fertilizer and water. The liquid fertilizer preferably has a high Nitrogen content, where the Nitrogen is Ammoniacal Nitrogen, which is 100% water soluble and readily available to the soil. Additionally, the water produced is potable water.

A liquid fertilizer derived from an organic source is also provided by the present invention. The organic source preferably includes, but is not limited to, plant and animal-bi-products, rock powders, seaweed, inoculants, conditioners, dairy product waste, livestock manure, liquid manure, worm castings, peat, guano, compost, blood meal, bone meal, fish meal, decomposing crop residue, cheese whey, dairy product waste, livestock manure, mixed liquor from food and livestock processing facilities, wastewaters from a variety of food processing operations, and combinations thereof. However, the list provided herein is not meant to be limiting, as any natural source that provides nitrogen, phosphate, and potash will work for purposes of the present invention. In a most preferred embodiment, the organic source is animal manure, most preferably, poultry manure.

The liquid fertilizer of the present invention preferably contains Ammoniacal Nitrogen derived from an organic source. The Ammoniacal Nitrogen provided by the fertilizer of the present invention is derived from anaerobically digested waste. The Ammoniacal Nitrogen in the liquid fertilizer of the present invention is preferably soluble Ammoniacal Nitrogen (N—NH4) that is immediately available to the plant. The Ammoniacal Nitrogen is preferably present in the liquid organic waste and thus, still present in the liquid organic waste filtrate. The Ammoniacal Nitrogen is preferably concentrated by the method of the present invention and the addition of the acid in the method also binds the ammonium ($NH_4$) molecules very tightly, thus restricting their conversion to free ammonia ($NH_3$) and subsequent loss through volatilization.

This Ammoniacal Nitrogen is preferably present in the liquid fertilizer in an amount of greater than 4%, more preferably from about 4% to 10% Nitrogen, more preferably from about 4% to 6% Nitrogen, and most preferably about 6% Nitrogen. Water is preferably present in the liquid fertilizer in an amount of from about 10% to 90%, more preferably from about 20% to 80%, more preferably from about 30% to about 60%, and most preferably from about 35% to 45%. Advantageously, the liquid fertilizer contains dissolved solids. Preferably, the liquid fertilizer contains at least 40,000 ppm to about 750,000 ppm dissolved solids, more preferably from about 100,000 ppm to about 700,000 ppm dissolved solids, preferably from about 200,000 ppm to 690,000 ppm dissolved solids, more preferably from about 300,000 ppm to about 680,000 ppm dissolved solids, and most preferably from about 550,000 ppm-650,000 ppm dissolved solids. It is generally preferred that the liquid fertilizer contains at least 40,000 ppm of dissolved solids. A preferred embodiment contains about 590,000 ppm dissolved solids.

In a preferred embodiment, the liquid fertilizer has little to no suspended solids in the composition. Preferably, the liquid fertilizer has from 0 ppm to 20,000 ppm suspended solids, more preferably less than 15,000 ppm, more preferably less than 13,000 ppm and most preferably less than 12,000 ppm, more preferably less than 10,000 ppm, still more preferably less than 5,000 ppm, still more preferably less than 3,000 ppm, and most preferably about 1,200 ppm. In a most preferred embodiment the liquid fertilizer has no suspended solids. The liquid fertilizer of the present invention may also contain potash. The potash is preferably soluble potash. The potash is preferably present in an amount from about 1% to 10%, most preferably about 5%. Sulfur may also be present in the liquid fertilizer. Sulfur is preferably present in the liquid fertilizer in an amount less than 10%, more preferably less than 8%, and most preferably 4% or less.

The fertilizer of the present invention preferably has a pH of between pH 3 to pH 7, more preferably from about pH 5 to pH 7, and most preferably about pH 6.5. Additionally, the fertilizer of the present invention is preferably free of pathogens. In a preferred embodiment, pathogens die within 24 hours of being introduced into the fertilizer.

Additionally, the fertilizer of the present invention may be certified by the United States Department of Agriculture ("USDA") as "USDA organic." The USDA has a program called the National Organic Program ("NOP") which specifically describes the synthetic materials that are allowed in fertilizer (www.ams.usda.gov/nop). Specifically, the list of acceptable ingredients is provided in the National Organics Program List in section 205.605. In a preferred embodiment, the method of the present invention produces a liquid fertilizer eligible for USDA organic certification. However, this is not a required element of the present invention. The method of the present invention producing a fertilizer of the present invention can be derived from an organic source without meeting the requirements of being certified USDA organic.

Definitions

"Organic" or "Organically derived", for purposes of the present invention refer to the natural source of the starting material for the fertilizer of the present invention. While not meant to be limiting, a starting material for the fertilizer may include, but is not limited to plant and animal bi-products, rock powders, seaweed, inoculants, conditioners, dairy product waste, livestock manure, liquid manure, worm castings, peat, guano, compost, blood meal, bone meal, fish meal, decomposing crop residue, cheese whey, dairy product waste, livestock manure, mixed liquor from food and livestock processing facilities, wastewaters from a variety of food processing operations, and combinations thereof. However, the list provided herein is not meant to be limiting, as any natural source that provides nitrogen, phosphate, and potash will work for purposes of the present invention.

"USDA organic" refers to a fertilizer or components that meet the guidelines as set forth by the USDA requirements to certify something as "organic."

"Ammoniacal Nitrogen" for purposes of the present invention refers to Nitrogen that is provided to the plant in a water soluble form, where the Ammoniacal Nitrogen includes ammonium ($NH_4^+$) and ammonia ($NH_3$). The Ammoniacal Nitrogen is readily plant available.

"Liquid organic waste," for purposes of the present invention refers to any aqueous solution that contains a dissolved protein, Ammoniacal Nitrogen, and other soluble nutrients. If the waste is in a solid or semi-solid form, water is preferably added to the solid or semi-solid material to form liquid organic waste, creating a fluid mixture of water and suspended and dissolved solids. The liquid organic waste can come from any organically derived source, as detailed in the definition for "organic" or "organically derived."

"Liquid organic waste filtrate," for purposes of the present invention, is the liquid organic waste, described above, where the suspended solids have been removed. Preferably, the suspended solids are removed by a filtration process.

"Suspended solids," for purposes of the present invention refer to those particles that won't pass through a 270 Dalton membrane under 500 psi of pressure.

"Dissolved solids," for purposes of the present invention refer to those particles that are smaller than the suspended solids, or those particles that will pass through a 270 Dalton membrane under 500 psi of pressure.

EXAMPLES

Example 1

This example illustrates one embodiment of the method and fertilizer of the present invention.
Materials and Methods Poultry manure was obtained and water was added to the poultry manure to form an aqueous mixture for the liquid starting material. A nanofiltration and reverse osmosis filtration system were used to remove the suspended solids. Once the suspended solids were removed, citric acid was added to the liquid starting material. Next, a vacuum evaporator was utilized at between 100-105° F. at a pressure of 26-28 inches of mercury. After the evaporation process was complete, an additional amount of citric acid was added to adjust the pH of the solution to around pH 6.5. The water vapor from the evaporation process was captured.
Results and Conclusions The resulting liquid fertilizer contained a soluble and rapid-acting nitrogen source, where the amount of nitrogen in the fertilizer was 6%. The potassium content of the fertilizer was 5% and the fertilizer did not contain any phosphorus. The potash content was about 5% and the fertilizer contained 4% sulfur. Suspended solids were present in the fertilizer at about 1,200 ppm and the fertilizer contained about 590,000 suspended solids. The organic matter present in the fertilizer was about 75% and it was about 11 pounds per gallon at 68° F. The liquid fertilizer was also pathogen free.

Additionally, the water vapor was recovered as potable water, suitable for drinking.

Example 2

This example illustrates use of the fertilizer for crops.
Materials and Methods

Using the fertilizer resulting from Example 1, crops may be fertilized. The crops may be fertilized at 10 lbs N/acre pre-plant or at planting; 25-35 lbs N/acre at thinning; and 10-15 lbs N/acre at pre-harvest.

Results and Conclusions

The total nitrogen in the fertilizer will be 45-60 lbs N/acre, where the fertilizer of the present invention has 0.66 lbs N/gallon, which equals 75-100 gallons/acre.

Example 3

This example illustrates the pathogen-free aspect of the fertilizer of the present invention.

Materials and Methods

Pathogens may be introduced into the liquid fertilizer of the present invention.

Results and Conclusions

After 24 hours, none of the pathogens introduced into the liquid fertilizer will be alive.

Example 4

This example illustrates the removal of suspended solids.

Materials and Methods

The solid separation and nutrient recovery process began with the effluent discharge from an anaerobic digester, hereafter referenced as "digestate". Digestate is a fluid mixture of water and suspended and dissolved solids including, but not limited to: nitrogen, phosphate, potash, secondary nutrients, micro-nutrients and organic matter found in anaerobically digested manure or other agriculturally related organic waste. The temperature of digestate was between 80° F. and 132° Fahrenheit.

The digestate was processed by a filtration mechanism to remove and capture large (>24 microns) suspended solids, hereafter referenced as "recovered solids". The recovered solids were separated from the digestate by the filtration mechanism have a moisture content of approximately 80 percent. These wet solids were then processed in a twin-screw helical heat exchanger to produce granular fertilizer with a moisture content of 5% or less. The wet recovered solids were then introduced into a series of rotating helical ducts. Hot oil flowing around through the ducts provided indirect heat. The constant motion and heat applied to the solids functioned to remove latent moisture from the solids. Rotation of the helical ducts served to cause the solids to bind to each other and form granules of solid fertilizer. These fertilizer granules may be later screened to size as desired. The evaporated moisture consisted of an ammonia-rich exhaust gas. This warm gas may be cooled to produce condensate that can be added to the filtrate from the filtering mechanism and further processed.

Example 5

This example illustrates the filtration process of the present invention.

Materials and Methods

The filtrate from the filtration mechanism was pH adjusted with citric acid to produce a pH of approximately 7.0 and then fed through a series of membrane filters hereafter referenced as "filtration steps". The first filtration step (nano-filtration) removed the remaining small (<24 microns) suspended solids that were not initially captured. The second filtration step (reverse osmosis) removed molecular dissolved solids that pass through the nano-filter. The material that passed through each filtration step, hereafter referenced as "permeate", was the feed stream to the subsequent filtration step. The concentrated product produced at each filtration step, hereafter referenced as "reject", was a high-value fertilizer product of unique solids and nutrient content. After a programmed time interval, a valve was opened to release the accumulated reject. The valve was then closed to allow the concentration of additional feed stream. This cycle repeated several times. The filtration method utilized continuous agitation through turbulent flow forced the filtrate against the membrane filters of a cylindrical mechanism. As the mechanism rotated, specially designed blades created vortices which removed foulants from the membrane surface and dramatically decreased boundary layer effects. Both reject and permeate were obtained and processed as previously disclosed.

Citric acid was added to the reject from the second filtration step (reverse osmosis) to produce approximately 6.0 pH. This pH adjustment stabilized the ammonium nitrogen contained in the reject and, in doing so, produced entrained gaseous carbon dioxide. Entrained gas was liberated from the reject by applying ultrasonic vibration and mechanical agitation. The acidified, de-gassed reject was further concentrated by vacuum evaporation.

The vacuum evaporation process was operated under vacuum of approximately 28 inches mercury and at a temperature of approximately 100° Fahrenheit. This process further concentrated the reject solution and produced a phosphate-free liquid organic fertilizer. Nitrogen and potash concentrations may be adjusted as required by controlling the volume of water removed through evaporation. The water vapor produced by evaporation was condensed and combined with permeate obtained from the final filtration step. The resultant solution was then processed by spiral reverse osmosis which removes any remaining solids and any pathogens not destroyed in the digestion process.

Results and Conclusions

The final products of the filtrate processing consisted of: at least two high-value liquid fertilizer products with uniquely different nutrient contents and agronomic uses, including a concentrated phosphate-free liquid organic fertilizer, and potable water.

Example 6

This example provides another embodiment of the present invention.

Materials and Methods

A typical pilot process demonstration included the collection of 300 gallons of digestate from the anaerobic digestion of poultry waste at 132° Fahrenheit. This stream had a total nitrogen content of 14 percent (dry weight basis) including an ammonium concentration of approximately 3,000 ppm. This stream was mechanically screened to remove large (>24 microns) suspended solids. The underflow from the mechanical screen was approximately 294 gallons with an ammonium concentration of approximately 2,800 ppm.

The 294 gallons was then filtered to remove the residual suspended solids greater in size than will pass through a 270 Dalton membrane under 500 psi pressure. This filtration step produced approximately 44 gallons of reject and 250 gallons of permeate. The ammonium concentration of the permeate stream was approximately 2,000 ppm.

The 250 gallons of permeate were pH adjusted with citric acid to 6.5 and then filtered by reverse osmosis. The reverse osmosis process produced approximately 37 gallons of reject and 213 gallons of permeate (liquid organic waste filtrate). Approximately 0.6 pounds of citric acid were added per gallon of reject produced. The ammonium concentration of the reject stream was approximately 15,000 ppm.

The 37 gallons of reject from the reverse osmosis process were then concentrated to approximately 6 gallons of finished product by the use of vacuum evaporation.

RESULTS AND CONCLUSIONS

The fertilizer of the present invention was produced. The ammonium concentration of the finished product was 60,000 ppm or six percent by weight.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the following claims.

We claim:

1. An aqueous liquid fertilizer comprising at least 4% dissolved ammoniacal nitrogen derived from a plant or animal-sourced waste filtrate.

2. The aqueous liquid fertilizer of claim 1, wherein the liquid fertilizer comprises 4-10% nitrogen, from about 1% to 10% potash, less than 10% sulfur, and is phosphate free.

3. The aqueous liquid fertilizer of claim 1, wherein the fertilizer comprises residues of one or more acids selected from the group consisting of citric acid, lactic acid, L-malic acid, acetic acid, formic acid, oxalic acid, uric acid, phosphoric acid, sulfuric acid, hydrochloric acid, nitric acid, hydrofluoric acid, and perchloric acid.

4. The aqueous liquid fertilizer of claim 1, wherein the waste filtrate is produced by filtering an anerobically digested animal manure effluent.

5. The aqueous liquid fertilizer of claim 1, wherein the fertilizer comprises from 40,000 to 750,000 ppm of dissolved solids.

6. The aqueous liquid fertilizer of claim 1, wherein the fertilizer comprises from 0 to 20,000 ppm of suspended solids.

7. The aqueous liquid fertilizer of claim 1, wherein the fertilizer is free of pathogens.

8. The aqueous liquid fertilizer of claim 1, wherein the fertilizer meets the criteria for USDA organic certification under the National Organic Program.

9. The aqueous liquid fertilizer of claim 1, wherein the fertilizer has an acidic or neutral pH.

10. A method of enhancing the nitrogen levels in soil comprising applying to the soil an aqueous liquid fertilizer comprising at least 4% dissolved ammoniacal nitrogen derived from a plant or animal-sourced waste filtrate.

11. The method of claim 10, wherein the fertilizer is applied to the soil pre-planting or at planting of a crop.

12. The method of claim 11, wherein the fertilizer is applied to the soil at a level of 10 lbs N/acre.

13. The method of claim 10, wherein the fertilizer is applied to the soil at thinning of a crop.

14. The method of claim 13, wherein the fertilizer is applied to the soil at a level of 25-35 lbs N/acre.

15. The method of claim 10, wherein the fertilizer is applied to the soil at pre-harvest of a crop.

16. The method of claim 15, wherein the fertilizer is applied at a level of 10-15 lbs N/acre.

17. The method of claim 10, wherein the fertilizer is applied to the soil at a rate of 75-100 gallons/acre.

18. The method of claim 10, wherein the fertilizer comprises 4-10% nitrogen, from about 1% to 10% potash, less than 10% sulfur, and is phosphate free.

19. The method of claim 10, wherein the fertilizer comprises:
(a) from 40,000 to 750,000 ppm of dissolved solids, or
(b) from 0 to 20,000 ppm of suspended solids.

20. The method of claim 10, wherein the fertilizer has an acidic or neutral pH.

* * * * *

(12) EX PARTE REEXAMINATION CERTIFICATE (12519th)
United States Patent
Love et al.

(10) Number: US 10,889,528 C1
(45) Certificate Issued: Feb. 16, 2024

(54) ORGANIC LIQUID FERTILIZER

(71) Applicants: Bill Love, Overland Park, KS (US); Development & Planning Consultants, L.L.C., Overland Park, KS (US); Dennis Crabtree, Tarpon Springs, FL (US)

(72) Inventors: Bill Love, Overland Park, KS (US); Dennis Crabtree, Overland Park, KS (US); John Martin, Overland Park, KS (US)

(73) Assignee: HYOF, LP, Overland Park, KS (US)

Reexamination Request:
No. 90/015,167, Nov. 23, 2022

Reexamination Certificate for:
Patent No.: 10,889,528
Issued: Jan. 12, 2021
Appl. No.: 16/731,538
Filed: Dec. 31, 2019

Related U.S. Application Data

(63) Continuation of application No. 16/297,334, filed on Mar. 8, 2019, now Pat. No. 10,556,837, which is a continuation of application No. 16/020,588, filed on Jun. 27, 2018, now abandoned, which is a continuation of application No. 13/791,442, filed on Mar. 8, 2013, now Pat. No. 10,023,501, which is a continuation of application No. PCT/US2012/047890, filed on Jul. 23, 2012, and a continuation of application No. 13/556,102, filed on Jul. 23, 2012, now abandoned.

(60) Provisional application No. 61/572,749, filed on Jul. 21, 2011, provisional application No. 61/572,751, filed on Jul. 21, 2011.

(51) Int. Cl.
*C05F 3/00* (2006.01)
*C05C 3/00* (2006.01)
*C05C 11/00* (2006.01)
*C05F 5/00* (2006.01)
*C05G 5/23* (2020.01)

(52) U.S. Cl.
CPC ............. *C05F 3/00* (2013.01); *C05C 3/00* (2013.01); *C05C 11/00* (2013.01); *C05F 5/00* (2013.01); *C05G 5/23* (2020.02); *Y02A 40/20* (2018.01); *Y02P 20/145* (2015.11)

(58) Field of Classification Search
None
See application file for complete search history.

(56) References Cited

To view the complete listing of prior art documents cited during the proceeding for Reexamination Control Number 90/015,167, please refer to the USPTO's Patent Electronic System.

*Primary Examiner* — Timothy J. Kugel

(57) ABSTRACT

A fertilizer derived from an organic source and a method of making are provided. The fertilizer of the present invention advantageously has a nitrogen content greater than 4%. The method of making the fertilizer also produces potable water.

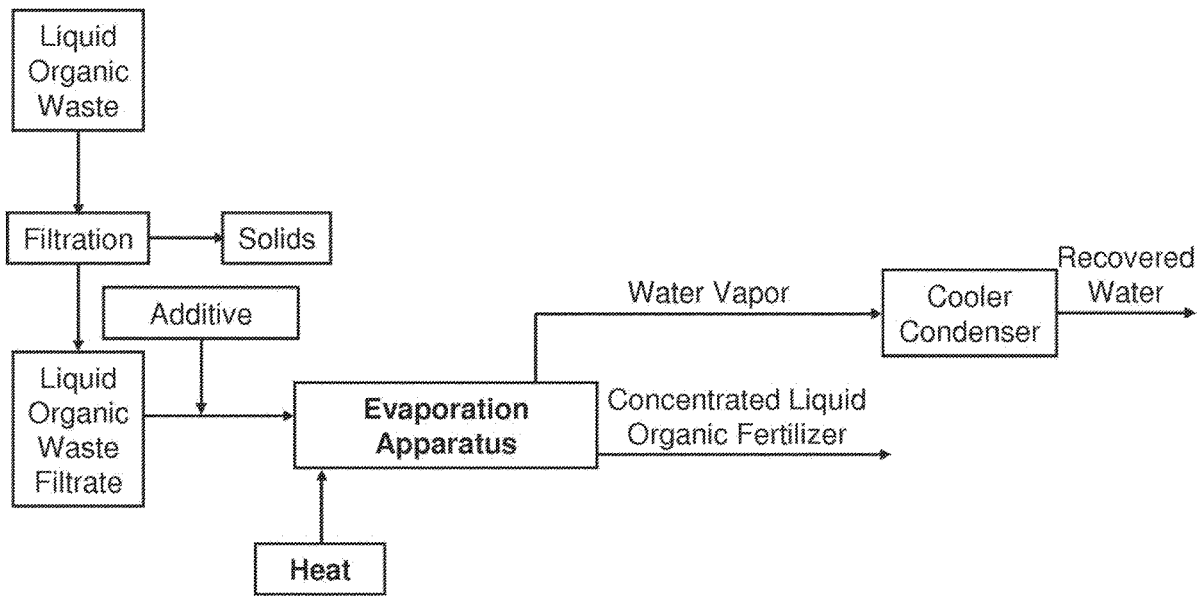

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 8 is cancelled.

Claims 1 and 10 are determined to be patentable as amended.

Claims 2-7, 9 and 11-20, dependent on an amended claim, are determined to be patentable.

New claims 21-46 are added and determined to be patentable.

1. An aqueous liquid fertilizer comprising at least 4% dissolved ammoniacal nitrogen derived from a plant or animal-sourced waste filtrate, *wherein the fertilizer meets the criteria for USDA organic certification under the National Organic Program.*

10. A method of enhancing the nitrogen levels in soil comprising applying to the soil an aqueous liquid fertilizer comprising at least 4% dissolved ammoniacal nitrogen derived from a plant or animal-sourced waste filtrate, *wherein the fertilizer meets the criteria for USDA organic certification under the National Organic Program.*

*21. An aqueous liquid fertilizer comprising at least 4% dissolved ammoniacal nitrogen derived from a plant or animal-sourced waste filtrate, wherein the fertilizer comprises less than 15,000 ppm of suspended solids.*

*22. The aqueous fertilizer of claim 21, wherein the fertilizer comprises less than 13,000 ppm of suspended solids.*

*23. The aqueous fertilizer of claim 22, wherein the fertilizer comprises less than 12,000 ppm of suspended solids.*

*24. The aqueous fertilizer of claim 23, wherein the fertilizer comprises less than 10,000 ppm of suspended solids.*

*25. The aqueous fertilizer of claim 24, wherein the fertilizer comprises less than 5,000 ppm of suspended solids.*

*26. The aqueous fertilizer of claim 25, wherein the fertilizer comprises less than 3,000 ppm of suspended solids.*

*27. The aqueous fertilizer of claim 21, wherein the fertilizer meets the criteria for USDA organic certification under the National Organic Program.*

*28. The aqueous fertilizer of claim 21, wherein the fertilizer comprises suspended solids no larger than particles capable of passing through a 500-mesh screen.*

*29. The aqueous fertilizer of claim 21, wherein the fertilizer comprises suspended solids no larger than 24 microns.*

*30. The aqueous fertilizer of claim 21, wherein the fertilizer comprises suspended solids no larger than will pass through a 270 Dalton membrane under a pressure of 500 psi.*

*31. The aqueous fertilizer of claim 21, wherein the fertilizer comprises residues of one or more acids selected from the group consisting of citric acid, lactic acid, L-malic acid, acetic acid, formic acid, oxalic acid, and uric acid.*

*32. An aqueous liquid fertilizer comprising at least 4% dissolved ammoniacal nitrogen derived from a plant or animal-sourced waste filtrate, wherein the fertilizer comprises suspended solids no larger than particles capable of passing through a 500-mesh screen.*

*33. The aqueous fertilizer of claim 32, wherein the fertilizer meets the criteria for USDA organic certification under the National Organic Program.*

*34. The aqueous fertilizer of claim 32, wherein the fertilizer comprises residues of one or more acids selected from the group consisting of citric acid, lactic acid, L-malic acid acetic acid formic acid oxalic acid and uric acid.*

*35. The aqueous fertilizer of claim 32, wherein the fertilizer comprises less than 15,000 ppm of suspended solids.*

*36. An aqueous liquid fertilizer comprising at least 4% dissolved ammoniacal nitrogen derived from a plant or animal-sourced waste filtrate, wherein the fertilizer comprises suspended solids no larger than 24 microns.*

*37. The aqueous fertilizer of claim 36, wherein the fertilizer meets the criteria for USDA organic certification under the National Organic Program.*

*38. The aqueous fertilizer of claim 36, wherein the fertilizer comprises residues of one or more acids selected from the group consisting of citric acid, lactic acid, L-malic acid, acetic acid, formic acid, oxalic acid, and uric acid.*

*39. The aqueous fertilizer of claim 36, wherein the fertilizer comprises less than 15,000 ppm of suspended solids.*

*40. An aqueous liquid fertilizer comprising at least 4% dissolved ammoniacal nitrogen derived from a plant or animal-sourced waste filtrate, wherein the fertilizer comprises suspended solids no larger than will pass through a 270 Dalton membrane under a pressure of 500 psi.*

*41. The aqueous fertilizer of claim 40, wherein the fertilizer meets the criteria for USDA organic certification under the National Organic Program.*

*42. The aqueous fertilizer of claim 40, wherein the fertilizer comprises residues of one or more acids selected from the group consisting of citric acid, lactic acid, L-malic acid, acetic acid, formic acid, oxalic acid, and uric acid.*

*43. The aqueous fertilizer of claim 40, wherein the fertilizer comprises less than 15,000 ppm of suspended solids.*

*44. An aqueous liquid fertilizer comprising at least 4% dissolved ammoniacal nitrogen derived from a plant or animal-sourced waste filtrate, wherein the fertilizer comprises residues of one or more acids selected from the group consisting of citric acid, lactic acid, L-malic acid, acetic acid, formic acid, oxalic acid, and uric acid.*

*45. The aqueous fertilizer of claim 44, wherein the fertilizer meets the criteria for USDA organic certification under the National Organic Program.*

*46. The aqueous fertilizer of claim 44, wherein the fertilizer comprises less than 15,000 ppm of suspended solids.*

\* \* \* \* \*